(No Model.)  3 Sheets—Sheet 1.
A. SPERL & J. GECMEN.
PORTABLE FRUIT EVAPORATOR.
No. 489,168.  Patented Jan. 3, 1893.
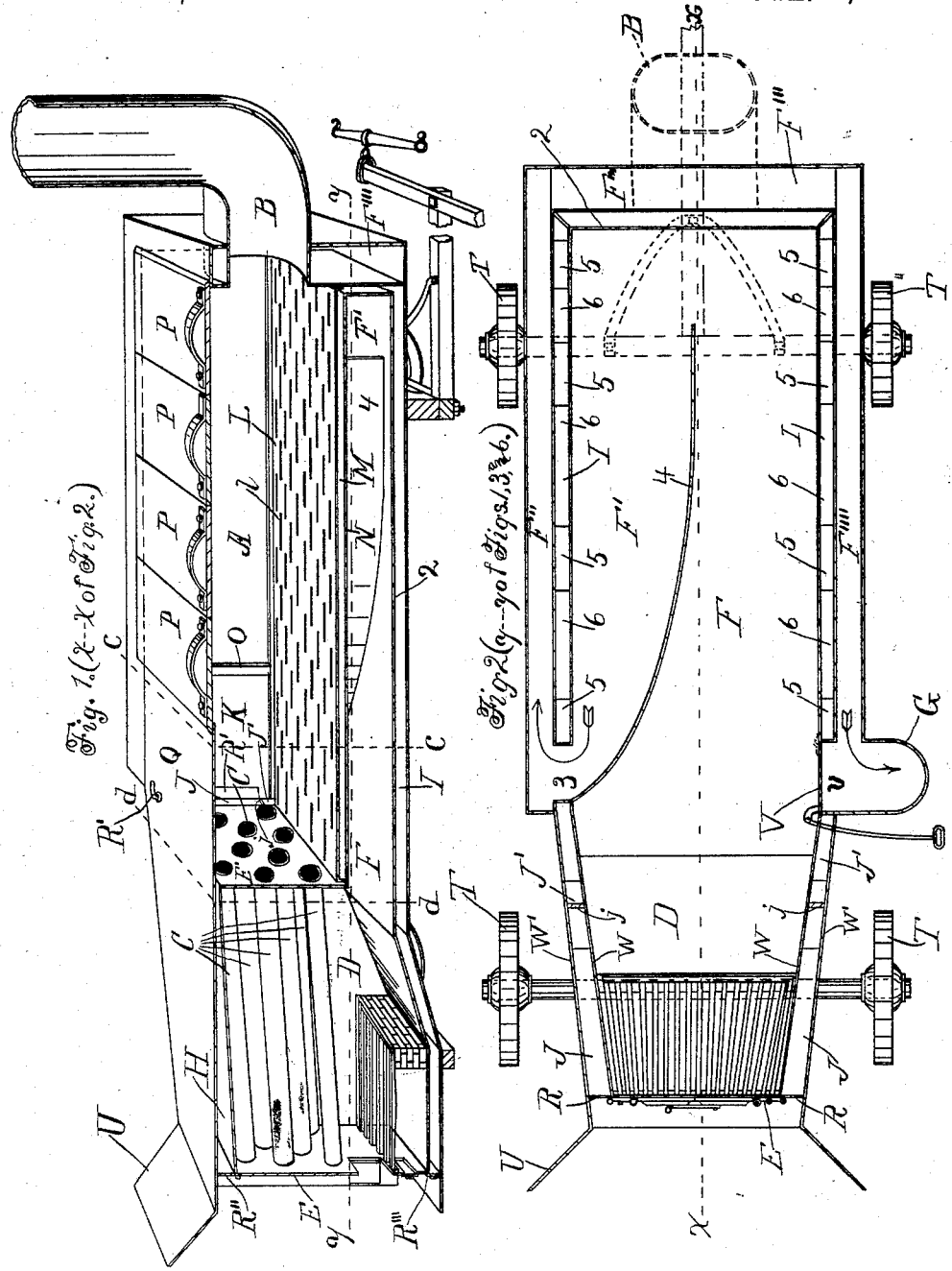
Witnesses.
M. W. Gee.
P. W. Harbeson.
Inventors.
Antonin Sperl and
Joseph Gecmen
Hazard & Townsend
their Attys.

(No Model.) 3 Sheets—Sheet 2.
A. SPERL & J. GECMEN.
PORTABLE FRUIT EVAPORATOR.
No. 489,168. Patented Jan. 3, 1893.
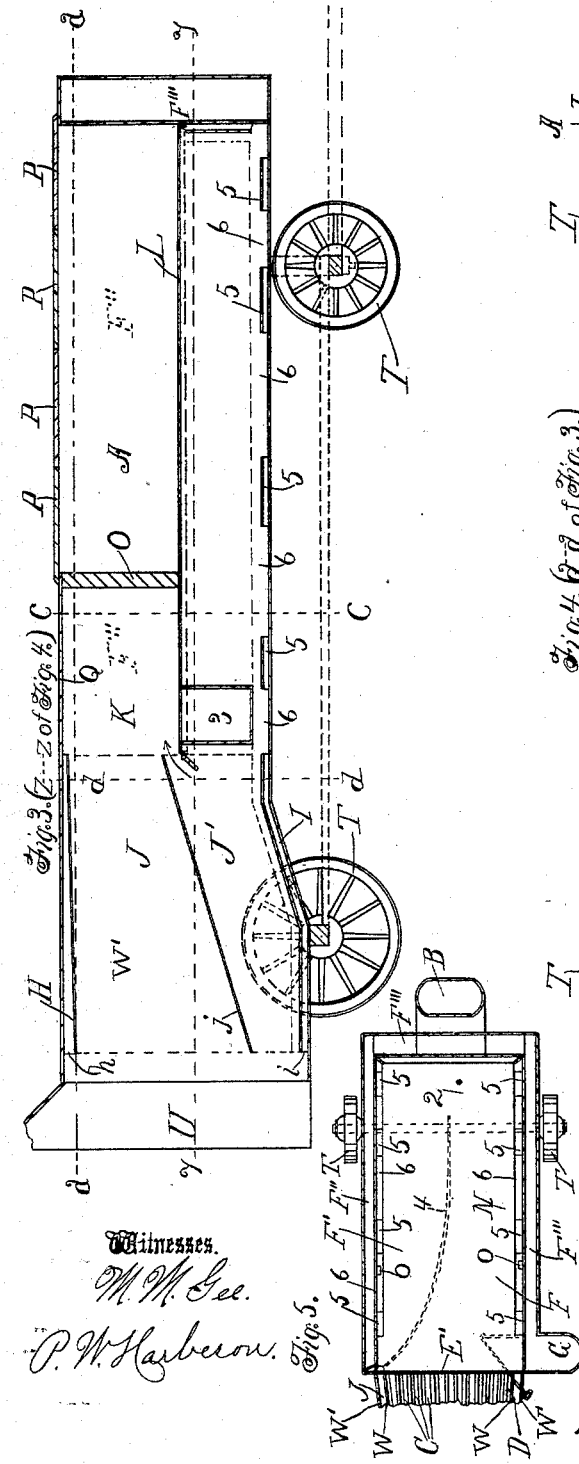
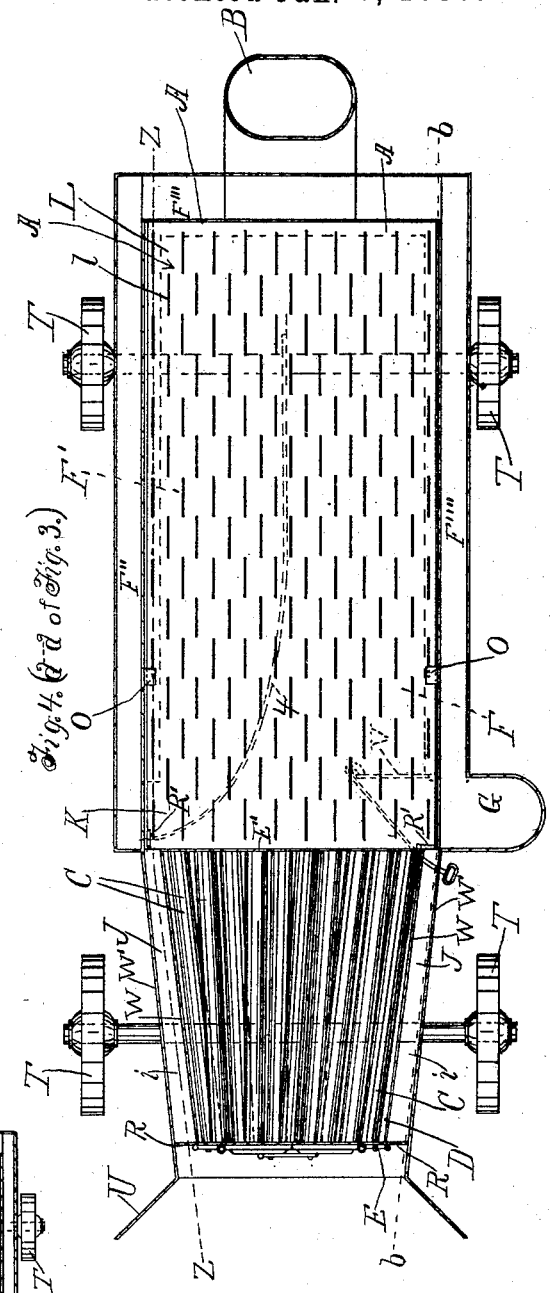
Witnesses.
M. M. Gee.
P. W. Harberon.
Inventors.
Antonin Sperl
Joseph Gecmen
by Hazard & Townsend
Their att'ys

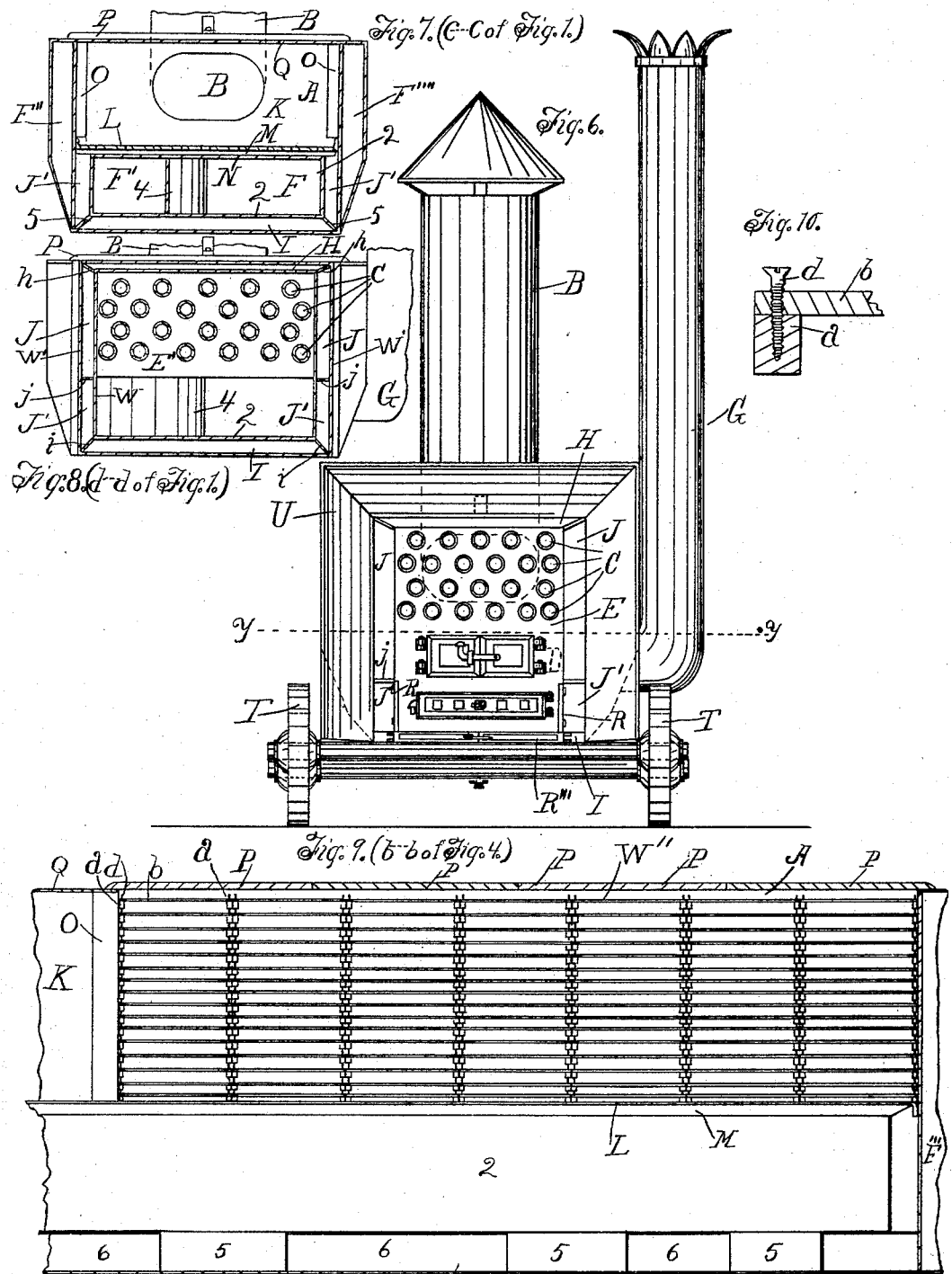

UNITED STATES PATENT OFFICE.

ANTONIN SPERL, OF LOS ANGELES, AND JOSEPH GECMEN, OF CUCAMONGA, CALIFORNIA; SAID GECMEN ASSIGNOR TO SAID SPERL.

PORTABLE FRUIT-EVAPORATOR.

SPECIFICATION forming part of Letters Patent No. 489,168, dated January 3, 1893.

Application filed April 20, 1892. Serial No. 429,845. (No model.)

*To all whom it may concern:*

Be it known that we, ANTONIN SPERL, residing at Los Angeles, in the county of Los Angeles, and JOSEPH GECMEN, residing at Cucamonga, in the county of San Bernardino, State of California, citizens of the United States, have invented a new and useful Portable Fruit-Evaporator, of which the following is a specification.

Our invention relates to the class of fruit evaporators which employ artificial heat.

The object of our invention is to produce at small expense a fruit evaporator of great evaporating capacity relative to its size in which there will be no liability of cooking the fruit or otherwise injuring it by the heat. Also to secure great capacity for evaporation with but slight expense of fuel; also to produce a superior quality of evaporated fruit.

Our fruit evaporator embraces as one of its essential features, the combination of a drying chamber; an escape or draft flue leading from one end of such drying chamber at the front of the evaporator; a fire-box arranged at the rear of the evaporator; an intermediate air distributing chamber arranged between the drying chamber and the fire-box and a series of tubes arranged with intervals between them in the fire-box and communicating between the intermediate chamber and the open air.

It also comprises the combination with the elements above specified of flues incasing the fire-box at the top, bottom and sides respectively, communicating between the distributing chamber and the open air, and suitable dampers arranged respectively to close and open the said flues.

It also embraces other features hereinafter set forth.

The accompanying drawings illustrate our invention.

Figure 1 is a perspective fragmentary vertical longitudinal mid-sectional view of our improved evaporator without the trays which are omitted for clearness of illustration. Line $x$—$x$ Fig. 2 indicates the line of section. Fig. 2 is a horizontal section on line $y$—$y$ Figs. 1 3 and 6. Fig. 3 is a vertical longitudinal section on the line indicated by $z$—$z$ Fig. 4. Fig. 4 is a horizontal section on line indicated by $a$—$a$ Fig. 3 with the perforated bottom or partition L in place. Fig. 5 is a fragmentary view similar to Fig. 4 with the perforated partition or bottom L removed. Fig. 6 is a rear end elevation. Fig. 7 is a cross-section on line indicated by $c$—$c$ Fig. 1. Fig. 8 is a cross-section on line indicated by $d$—$d$ Fig. 1. Fig. 9 is a fragmentary longitudinal cross-section at view on line indicated by $b$—$b$ Fig. 4 showing the trays in place. Fig. 10 is a detail of a portion of the tray.

A is the drying chamber.

B is the large escape or draft flue arranged at the front of the evaporator and opening from one end of the drying chamber.

D is the fire-box arranged at the opposite end of the evaporator.

C indicates the series of air induct flues or tubes arranged with intervals between them in the upper portion of the fire-box D and opening through the rear wall E of the evaporator and leading therefrom forward through the fire-box at a slight upward inclination, through the front wall E' of the fire-box into the intermediate distributing chamber K which is practically an extension of the evaporating chamber A.

G is a suitable smoke stack.

F, F', F'', F''', F'''', are suitable flues communicating between the fire-box and the smoke stack and arranged to conduct the heat of the fire forward from the fire-box.

Suitable flues H I J J and J' J' are arranged to conduct air into contact with the heating surfaces of the walls of the fire-box and the heat carrying flues F F' &c. which connect the smoke stack G with the fire-box D.

K is an intermediate air distributing chamber arranged between the drying chamber and the inner ends of the induct air tubes C.

The flues J, J', J J' are arranged at the sides of the fire-box and the partitions $j$ are arranged extending from the side wall W of the fire-box to the wall W' of the case of the evaporator so that the supply of air which is heated by the lower part of the fire-box which is more in direct contact with the fire, can be controlled separate from the air which is heated by contact with the upper part of the walls of the fire-box.

A perforated partition L is arranged between the drying chamber and the top sheet or partition N (which is arranged above the heat carrying flues F F') to form an air space M between the drying chamber and the top sheet of the heat carrying flues F F'.

O O are cleats arranged at the sides of the evaporator to prevent trays when placed in the drying chamber from passing into the intermediate air distributing chamber K.

The drying chamber is provided with a series of removable lids P which give access into the drying chamber for the insertion and withdrawal of the trays of fruit.

The distributing chamber K is provided with a permanent roof Q which prevents the introduction of the trays into such chamber K.

Suitable dampers R R' &c. are arranged to control the air and direct it through the evaporator in the quantities and at the points desired.

The anterior portions F F' of the smoke flue which is arranged beneath the drying and distributing chambers comprises the combination of a flat horizontal box 2 open at one end and closed at the other and communicating at its open end with the fire-box D and communicating with the rest of the flue F'' &c. by a passage 3 arranged near the rear end of the drying and distributing chamber; such passage, and a vertical partition 4 leading from the rear wall of such passage forward toward the front of such box, leaving a space between the front end of the partition and the front end of the box.

The box 2 is held in position in the evaporator by the braces 5 5 connecting the box with the bottom of the evaporator.

Air spaces 6 are provided in the braces 5 to allow the air to pass from the flue I up into the chamber M beneath the perforated partition L so that the air which is heated by contact with the bottom of the box 2 will be allowed to rise up through the perforated bottom or partition L into the drying and distributing chamber.

The principle upon which our improved evaporator operates is as follows;—to wit. By means of the device shown a large amount of air in proper condition for absorbing aqueous vapor can be brought into contact with the fruit in the drying chamber and be discharged therefrom through the larger escape or draft flue B after it has become charged with vapor. The evaporator is not designed to employ a high degree of heat and it is so arranged that the fruit is not exposed to the action of the heat except through the medium of the air which is conducted through the drying chamber to be discharged through the draft flue B.

Our improved evaporator is designed to take advantage of the wind to increase the amount of air brought into contact with the fruit and for this purpose it is mounted upon wheels T and is provided at its rear end with a suitable cowl U so that the evaporator may be drawn by means of horses into the vineyard or orchard where the ripe fruit is, and can then be turned with its rear or fire-box end directly toward the breeze so that the breeze striking within the cowl will be conducted into the open mouths of the tubes C and of the flues H I J which surround the fire-box, so that the air will thereby be forced through such tubes and flues (where it becomes heated) into the distributing chamber K and thence onward through the drying chamber A and out through the draft flue B. The air in its passage through the tubes and flues into the distributing chamber becomes heated by its contact with the heating surfaces of such tubes and flues and becomes expanded and thus has its capacity for absorbing moisture increased so that as it passes through the drying chamber A it readily absorbs the moisture from the fruit. The air which enters through the bottom flue I passes upward through the perforations l in the partition L, part of it passing direct into the drying chamber and part of it passing first into the air distributing or mingling chamber K, the capacity of the perforations L being so slight that the volume of air passing through the flue I is too great to pass through those perforations only which are underneath the drying chamber although the upward discharge from such flue I into the intermediate chamber M is at the front of the evaporator and near to the escape flue B.

In practice sufficient fire is kept burning in the fire-box D to heat the air to the degree desired.

V is a damper arranged at the end of the smoke and heat carrying flues F F' F'' F''' and F'''' (which are practically but one flue leading in a serpentine course from the fire-box D to the smoke stack G). It is arranged to open and close the passage v which communicates between the fire-box D or flue F direct into the smoke stack so that in starting the fire within the fire-box, direct communication with the smoke stack G can be secured until the fire is well started, after which the damper is closed to force the draft into and through the entire serpentine flue which passes underneath the distributing and drying chamber and around the two sides and one end of such chambers.

W'' represents the trays in place in the drying chamber. These trays are formed in the usual manner of two side cleats $a$ $a$ and the boards or floor $b$ secured on top of such cleats but my improved tray differs from that in common use in that it is provided with tray supporting legs or pins $d$ which project upward or downward from such tray to hold the trays apart when the trays loaded with fruit are placed in position in the drying chamber. These pins or legs are made of sufficient height to project above the fruit laid upon such trays so that when the trays are placed in position in the drying chamber one above another, they will be held sufficiently apart by the legs or pins to allow the air to circulate freely between the several trays.

The air induct flues H, I, J, J, J', and J' are separated from each other by suitable partitions *i h j* and are respectively controlled by their respective dampers, R'', R''', R', R', R and R.

The air which flows in through J' and J' is heated more than that which flows in through J and J or through I or H and the heat of the air admitted to the distributing chamber can be regulated by the proper manipulation of the above mentioned dampers. If the fire is so hot as to heat the air too much, the flues J' J' may be partly or wholly closed and the flues H and J, J may be partly or wholly opened thus admitting less heated air and more cooler air. If the heat of the fire is not so great, the upper dampers may be closed to a greater extent and the dampers J' J' be open to a greater extent. By this arrangement of the top flue H with its damper, the bottom flue I with its damper, the two upper side-flues J, J with their dampers and the two lower side-flues J' J' with their dampers we are enabled to more accurately regulate the temperature of the air which passes through the evaporator in contact with the fruit, and are enabled to dry the fruit rapidly without any injury from too great heat, thus producing a superior quality of dried fruit in a short time and at less expense than is ordinarily required.

The provision of the numerous and capacious hot air tubes and flues and the capacious egress or draft flue enables us to bring into contact with the fruit to be dried, a very large amount of air in proper condition for absorbing the moisture from the fruit.

We do not depend upon the heat for producing the evaporation further than in that it expands the air so that it more readily takes up the moisture acting somewhat upon the plan of vacuum evaporators. The upward inclination of the air ingress or induct tubes C assists in creating a draft therethrough. The flues H, J, J', J', and J' taper from their outer ends inward so that it is compressed as it passes along and through such flues and is projected from the inner ends of the flues into the distributing chamber with considerable force, expanding at the same time both from its original elasticity and from the expansive effect of the heat. This arrangement and consequent operation produces a more effectual intermingling of the air within the mingling and distributing chamber K.

Now having described our invention, what we claim as new and desire to secure by Letters Patent is;—

1. In a fruit evaporator, the combination set forth of the drying chamber; the escape or draft flue leading from one end of such drying chamber at the front of the evaporator; the fire-box arranged at the rear of the evaporator; the intermediate air distributing chamber arranged between the drying chamber and the fire-box; a series of tubes arranged with intervals between them in the fire-box and communicating between the intermediate chamber and the open air; flues incasing the fire-box at the top bottom and sides, respectively communicating between the distributing chamber and the open air and suitable dampers arranged respectively to close and open the said flues.

2. In a fruit evaporator, the combination set forth of the drying and distributing chambers; the fire-box; the air induct tubes arranged in the fire-box with intervals between them and communicating between the open air and such chambers, the draft flue opening from such chambers; the smoke stack and the serpentine flue communicating between the fire-box and the smoke-stack and having its anterior portion arranged beneath the drying chambers comprising the combination of the flat horizontal box 2, open at one end and closed at the other end and communicating at its open end with the fire-box and communicating with the rest of the flue by a passage arranged near the rear end of the chambers; such passage, and a vertical partition leading from the rear wall of such passage toward the closed end of such box, leaving a passage between the end of the partition and the end of the box, and the braces arranged at intervals apart and connecting the box with the bottom of the evaporator, and holding it thereabove.

ANTONIN SPERL.
JOSEPH GECMEN.

Witnesses to the signature of Antonin Sperl:
    JAMES R. TOWNSEND,
    ALFRED I. TOWNSEND.

Witnesses to the signature of Joseph Gecmen:
    J. E. NOWLIN,
    W. D. BUCKEW.